May 15, 1934.  O. U. ZERK  1,959,254

CUSHIONING ELEMENT AND METHOD OF MAKING SAME

Filed Oct. 24, 1930   11 Sheets-Sheet 1

INVENTOR.
Oscar U. Zerk
By Slough + Canfield
ATTORNEYS.

May 15, 1934.                    O. U. ZERK                    1,959,254
            CUSHIONING ELEMENT AND METHOD OF MAKING SAME
                  Filed Oct. 24, 1930        11 Sheets-Sheet 2

INVENTOR.
Oscar U. Zerk
BY
Dlough & Canfield
ATTORNEYS.

May 15, 1934.   O. U. ZERK   1,959,254
CUSHIONING ELEMENT AND METHOD OF MAKING SAME
Filed Oct. 24, 1930   11 Sheets-Sheet 3

INVENTOR.
Oscar U. Zerk
BY
Slough + Canfield
ATTORNEYS.

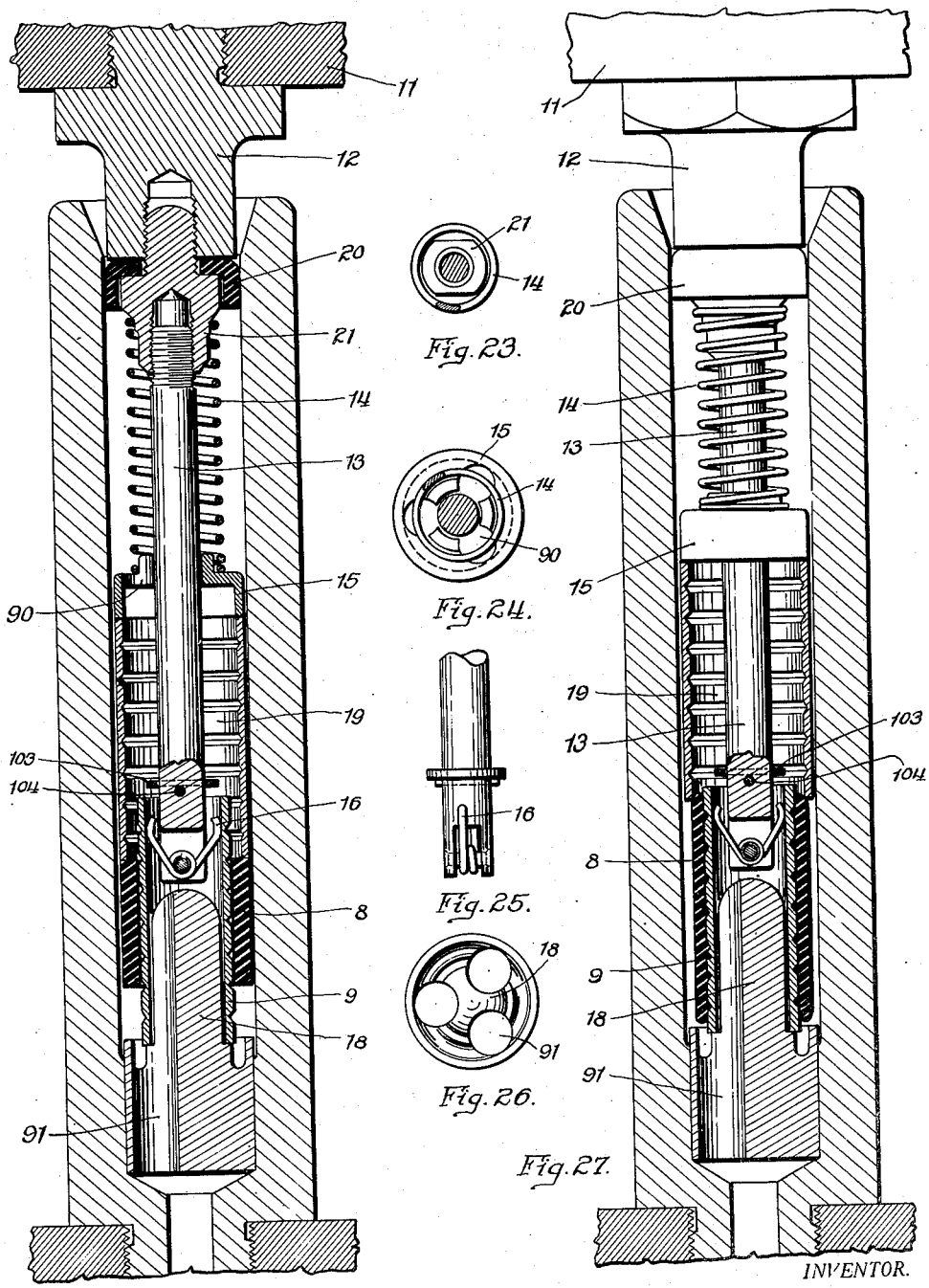

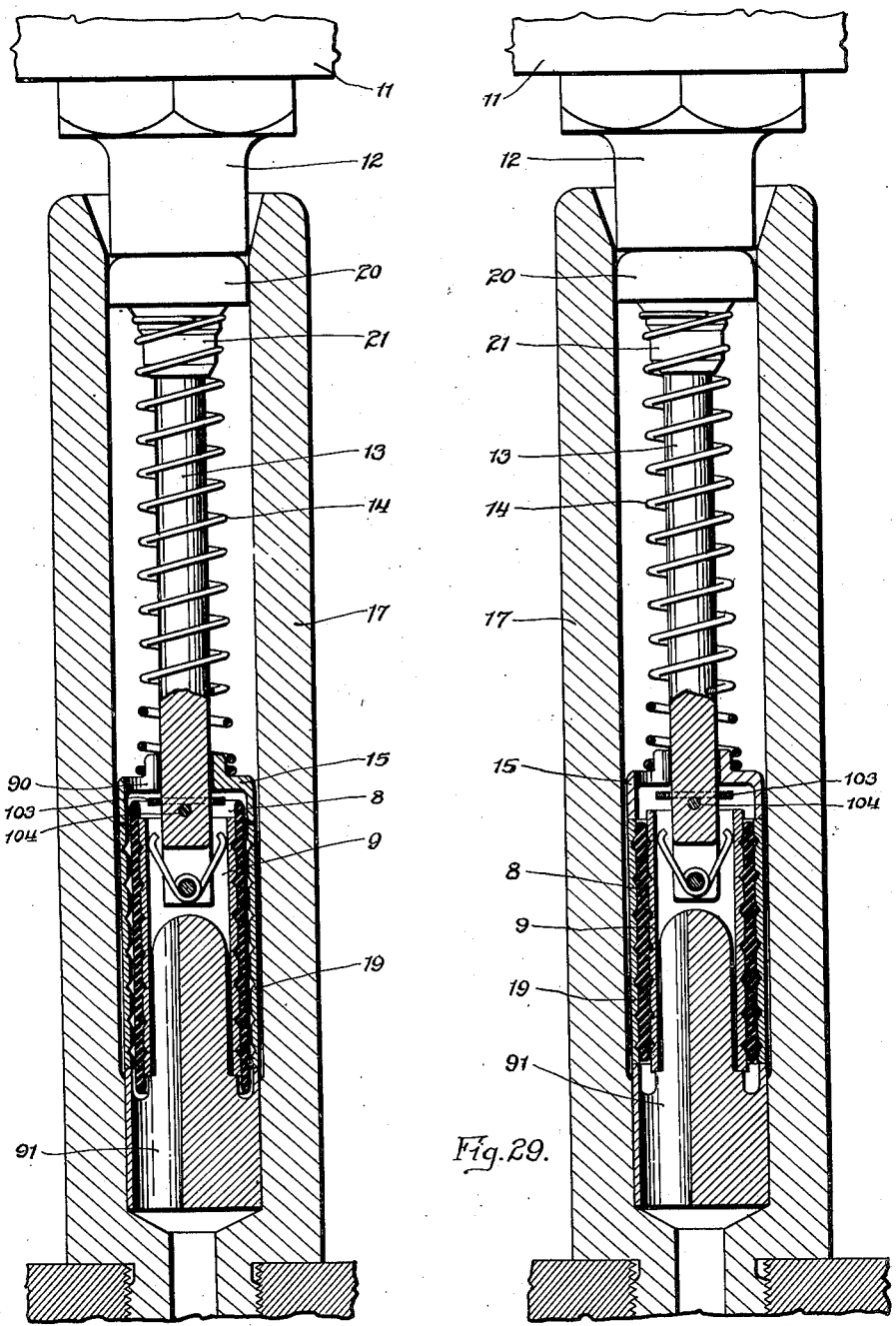

INVENTOR.
Oscar. U. Zerk
BY Slough + Canfield
ATTORNEYS

May 15, 1934.  O. U. ZERK  1,959,254
CUSHIONING ELEMENT AND METHOD OF MAKING SAME
Filed Oct. 24, 1930    11 Sheets-Sheet 7

INVENTOR.
Oscar U. Zerk
By Slough & Canfield
ATTORNEYS.

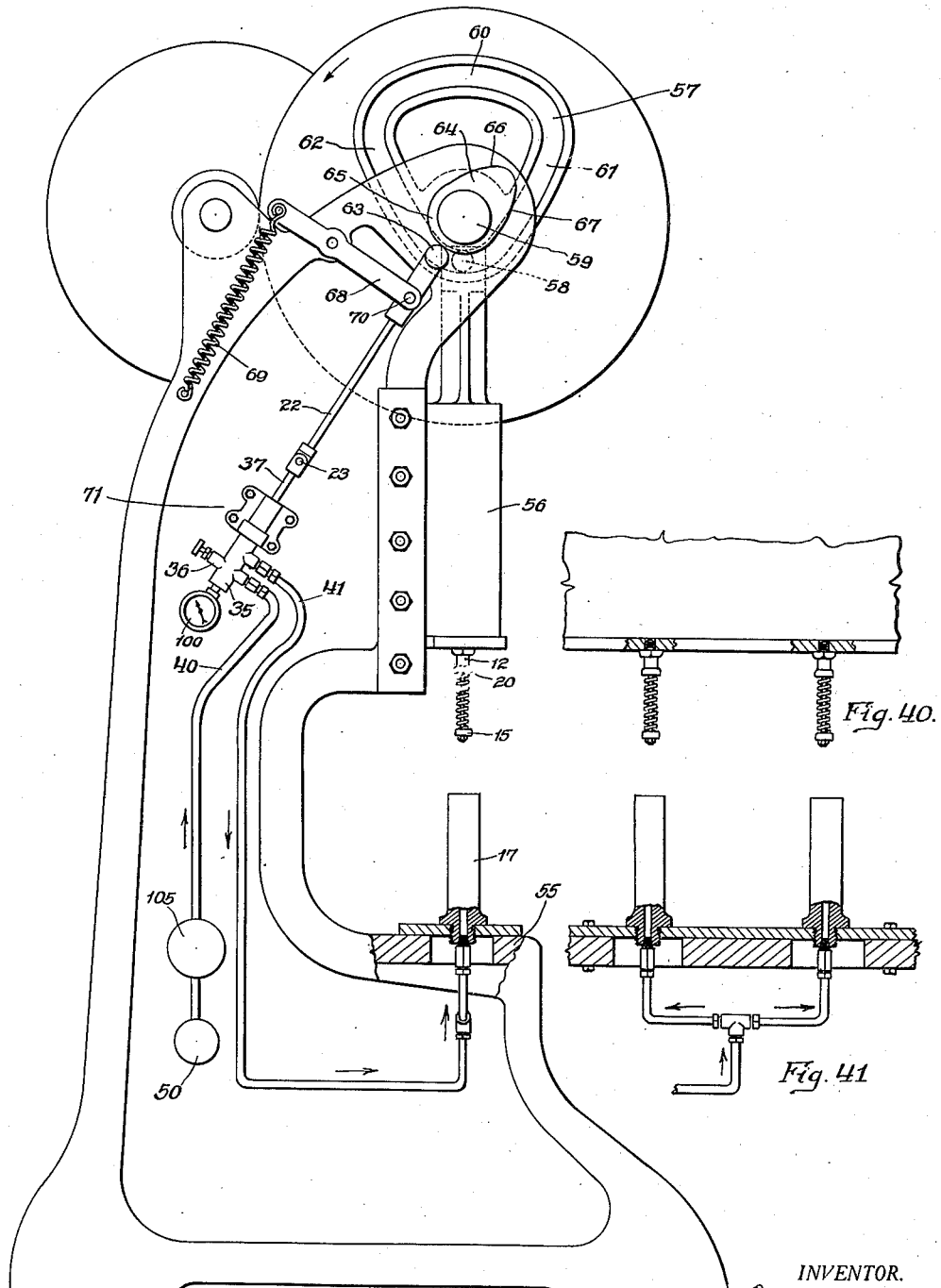

May 15, 1934. O. U. ZERK 1,959,254

CUSHIONING ELEMENT AND METHOD OF MAKING SAME

Filed Oct. 24, 1930 11 Sheets-Sheet 11

INVENTOR.
Oscar U. Zerk
BY Slough + Canfield
ATTORNEYS

Patented May 15, 1934

1,959,254

UNITED STATES PATENT OFFICE 1,959,254

CUSHIONING ELEMENT AND METHOD OF MAKING SAME

Oscar U. Zerk, Chicago, Ill.

Application October 24, 1930, Serial No. 490,905

41 Claims. (Cl. 29—88.2)

My invention relates to cushioning elements in general, and more particularly to the multi-tubular type of rubber bushings consisting of concentrically telescoped metal tubes having tubes of rubber or other suitable elastic or resilient material interposed therebetween.

This general type of bushing has been well known for many years, and has been used for the purpose of entirely eliminating lubrication of the so-called swivel bearing, having movement of limited angularity, as for instance, shackle bearings, coupling bearings, and other of the various bearings used in an automobile, by inserting the rubber bushing between the male and the female members of the bearing.

In some of the first rubber bushings made the rubber was vulcanized to the two metal tubes. However, aside from the expense connected with this method, other objectionable features were noted: first, lateral movement or "shimmeying" of the two metal tubes in the direction of the axis when in use; second, relatively quick rotting of the rubber because it is normally not under pressure over all of its circumference; and third, the difficulty of vulcanizing rubber to ordinary steel tubing. Hence, this method was not a practical one.

In order to overcome these difficulties, a tube of rubber considerably thicker than the space between the two metal tubes was now pressed between them, but, due to the excessive resistance when forcing a rubber tube between two metal tubes whereby the thickness of the wall of the rubber tube is considerably greater than the space between the two metal tubes, an enormous pressure had to be exerted and relatively large and expensive machinery as well as a great deal of care used. Furthermore, some of the lubricant which must be applied to the surfaces of the rubber, or the metal tubes to reduce friction before the assembly operation takes place will remain between the rubber and metal surfaces with the undesirable result that relative rotation of the rubber and metal tubes will occur when in use. Several other mechanical methods have been employed to interpose a piece of rubber under pressure between the metal tubes, but they are generally expensive and more or less unreliable.

An object of my invention is to substitute for the mechanical systems heretofore used a hydraulic or pneumatic system to provide a layer of rubber or other resilient material between relatively spaced telescoped metal tubes with a minimum amount of effort.

Another object of my invention is to provide as an article of manufacture an improved resilient bushing.

Another object of my invention is to provide improved mechanism for the quantity production of resilient bushings.

Another object of my invention is to provide an improved method for making resilient bushings.

Another object of my invention is to provide an improved method of making a rubber bushing element of that type involving relatively telescoped tubes with an inherently resilient tube interposed between them.

Another object of my invention is to provide an improved method of assembling the metal and rubber elements of such a bushing.

Another object of my invention is to provide as an article of manufacture an improved rubber bushing element comprising at least several relatively telescoped tubes of relatively rigid material which are maintained in relatively spaced relation by interposed tubes of relatively resilient material, each of the resilient tubes being compressed between adjacent pairs of the relatively rigid tubes.

Another object of my invention is to provide an improved cushioning element adapted to be employed to absorb the shocks and the torsional and longitudinal strains of mechanical linkages such as the shackle bolt link connections between a spring and supporting portions of an automobile vehicle.

Another object of my invention is to provide such a cushioning element as an article of manufacture comprising in combination with an internal bolt a superposed split metal tube fitted thereon, a rubber bushing telescoped over the split metal tube, and an outer tube telescoped over the rubber tube.

Another object of my invention is to provide such a cushioning element as an article of manufacture comprising in combination with an internal bolt a superposed split metal tube fitted thereon, a rubber bushing telescoped over the split metal tube, and an outer tube telescoped over the rubber tube, and shackle hanger elements to which the bolt is secured at either end, said shackle hanger element being interlocked with one of the metal tubes.

Another object of my invention is to provide an improved joint between a leaf spring and an article to be supported thereby comprising an eye end portion of the spring, a tube forced into the said eye, a rubber tube telescoped within the outer tube and a split inner metal tube, telescoped within the rubber tube and a bolt forced tightly within the bore of the split inner tube.

Another object of my invention is to provide in a multi-tubular bushing element having an intermediate inherently resilient tube, an inner metallic tube therefor so constructed that it will yield radially to a slight degree to permit the forcing of a bolt through the bore of the bushing.

Another object of my invention is to provide in a multi-tubular bushing element having an intermediate inherently resilient tube, an inner metallic tube therefor, which is split longitudinally whereby it may be slightly expanded against the inherent resiliency of the rubber superposed over it, when a shackle bolt or the like is forced through its bore in intimate contact with its inner wall.

Another object of my invention is to provide as an article of manufacture, an improved cushioning element comprising in combination with an internal bolt, a relatively thick split inner metal tube telescoped thereon, a rubber tube telescoped on the inner tube, and a relatively thin outer metal tube which is not split telescoped over the rubber tube.

Another object of my invention is to provide for the removal of water particles from the interior portions of the multi-tubular article subsequent to the assembling operation, involving the use of hydraulic pressure, by heating the article preferably above the boiling point of the water or other liquid employed in the processes of assembling the article.

Another object of my invention is to provide an improved method of assembling the different parts of an article of the above general character, whereby a rubber tube may be placed under pressure between two metal tubes without requiring the use of a mandrel within the inner tube to prevent the same from collapsing, and without requiring the use of any outwardly disposed means to prevent expansion of the outer metal tube. I accomplish this object by employing fluid pressure whereby all pressures exerted on the metal tubes are equalized on the inner and the outer walls thereof.

Another object of my invention is to provide an improved rubber bushing element having inner and outer relatively telescoped metallic tubular elements, each adapted to be affixed to separate elements of a mechanism, with an interposed compressed layer of rubber between the elements, which will possess improved qualities over similar bushing elements previously used.

Another object of my invention is to provide an improved method of assembling one or more rubber tubular elements with two or more metallic elements of differing diameters, with the rubber elements interposed between adjacent metallic elements and held in compression therebetween.

Another object of my invention is to provide in an improved method of assembling said resilient bushing, improved means whereby the rubber tube under relatively low mechanical pressure may be moved longitudinally into the center of the length of one of the two metal tubes, thus bringing the rubber tube under an initial tension and creating sufficient adhesion between the rubber tube and one of the metal tubes, to prevent the rubber tube from losing its central position during the subsequent introduction of hydraulic or pneumatic pressure.

Another object of my invention is to provide in an improved method of assembling said resilient bushing, improved hydraulic or pneumatic means whereby the rubber tube may be diametrically contracted and longitudinally expanded along and in tight adhesive engagement with an inner metal tube, or may be diametrically expanded and longitudinally elongated along and in tight adhesive engagement with an outer metal tube.

Another object of my invention is to provide in an improved method of assembling said resilient bushing, improved means whereby after the rubber tube has been sufficiently, as above referred to, diametrically contracted and longitudinally expanded, the other of the metal tubes may be moved without any substantial friction over the said rubber tube.

Another object of my invention is to provide in an improved method of assembling said resilient bushing, means therefor involving the expenditure of but relatively little force in the actual assembling operation.

Another object of my invention is to provide in an improved method of assembling said resilient bushing, improved means whereby the rubber tube may first be diametrically contracted and longitudinally expanded and then by the withdrawal of such means be diametrically expanded and longitudinally contracted.

Another object of my invention is to provide in an improved method of assembling said resilient bushing, means to effect tight adhesion between the said rubber and metal tubes of said resilient bushing, by releasing the pneumatic or hydraulic pressure previously exerted thereon to expand said rubber tube.

Another object of my invention is to provide an improved resilient bushing comprising inwardly directed depressions on the outside surface of the inner metal tube.

Another object of my invention is to provide an improved resilient bushing comprising outwardly directed depressions on the inside surface of the outer metal tube.

Another object of my invention is to provide an improved resilient bushing comprising depressions in either of the metal tubes either in a circular or a longitudinal direction, or in both directions.

Another object of my invention is to provide improved means, in an improved method of assembling said resilient bushing, to contract or expand the rubber tube depending upon whether the rubber is pressed into or over the metal tube, until a substantial space is provided between the diameter of the rubber tube and the diameter of the metal tube.

Another object of my invention provides improved means in an improved method of assembling said resilient bushing, to release the pressure exerted thereon, after the rubber tube of the resilient bushing has been first hydraulically or pneumatically expanded in the longitudinal direction and reduced in diameter, thereby longitudinally contracting and diametrically expanding said rubber tube to fill all of the depressions in the two metal tubes.

Another object of my invention is to accomplish in the assembly of my improved resilient bushing the telescoping of the metal tubes with the rubber tube interposed therebetween, without the necessity of any mechanical assembly means entering the assembly chamber from the outside.

Another object of my invention is to substantially effect the prevention of relative longitudinal movement of the tubes of an improved resilient bushing by turning or bending one of the rigid tubes at its ends in the direction of the other tube, thus embracing the resilient tube.

Another object of my invention is to effect greater relative angularity of movement of the two relatively telescoped tubes of the resilient bushing of my invention, employing rubber therebetween, by using three or more telescoping rigid tubes and two or more rubber tubes, one interposed between each adjacent pair of rigid tubes.

Another object of my invention is to provide improved means to effect substantial equalization of pressure against the metal tubes of my improved resilient bushing during the assembling operation, thus doing away with the necessity of using arbors or other outside expansion resisting means.

Another object of my invention is to assemble the metal and rubber tubes in such a manner that no slippery substance is left between the two tubes after the assembly operation.

Another object of my invention is to provide an improved apparatus for assembling resilient bushings, comprising an assembly chamber having a male and female member, whereby low hydraulic fluid pressure is employed during a period when the female member of the assembly chamber has been closed by the male member and substantially during the time when the male member comes to a standstill in its movement relative to the female member, and whereby fluid of a relatively high pressure during a later period may be used to effect telescoping of the outer rigid tube of the resilient bushing of my invention over the inner rigid tube (or vice versa) and interposed rubber tube adhering thereto due to a change in form of the rubber tube but without substantially changing the cubic capacity of the assembly chamber.

Another object of my invention is to provide an improved apparatus for assembling resilient bushings, comprising a fluid pressure chamber comprising a plurality of elements, one of which is arranged to remove the assembled rubber bushing from the chamber.

Another object of my invention is to provide means, in an improved method of assembling resilient bushings, for filling the assembly chamber with water or other fluid at relatively low pressure before closing the chamber by the male element.

Another object of my invention provides in an improved method of assembling rubber bushings, for the use of the upcoming water in the assembly chamber of the apparatus used therein, in the hydraulic system, to flush away the air bubbles which may adhere to any member in the assembly chamber.

Another object of my invention provides in an improved method of assembling rubber bushings, compressed air or gas, in the pneumatic system, for deforming the rubber tube of the rubber bushing, after the assembly chamber is substantially closed at all places except at the compressed air or gas inlet.

Another object of my invention is to effect by spring pressure exerted upon one tubular element of a pair of tubular elements, whereof one of the elements is of rubber or like material, relative telescoping of the elements as a function of the assembly of the multi-tubular bushing.

Another object of my invention is to effect by the force of gravity exerted upon one tubular element of a pair of tubular elements, whereof one of the elements is of rubber or like material, relative telescoping of the elements as a function of the assembly of the multi-tubular bushing.

Another object of my invention is to effect by spring pressure augmented by the force of gravity exerted upon one tubular element of a pair of tubular elements, whereof one of the elements is of rubber or like material, relative telescoping of the elements as a function of the assembly of the multi-tubular bushing.

Another object of my invention is to provide for the application of fluid pressure against a tubular surface of a bushing of rubber or like material, to vary certain of its diametrical dimensions, whereby another tube may be relatively telescoped with it and which would have been difficult to accomplish before the application of the fluid pressure, and at the same time to provide a predetermined and sufficient excess of fluid pressure whereby to compensate for variations which may be expected in the commercial limits of diametrical dimensions of either or both of the tubular parts to be telescoped.

Another object of my invention is to provide improved fluid pressure regulating means whereby by virtue of the regulation of pressure of fluid the certain diametrical dimensions of a tube of rubber or like material may be changed, in order to permit ready telescoping of a metal tube with said rubber tube, with a predetermined desirable excess of fluid pressure to allow for the commercial variations in diametrical dimensions of the tubes to be telescoped.

Another object of my invention is to effect the prevention of relative movement between an inner metal tube of the resilient bushing of my invention when employed in a shackle or like member, and the bolt of said shackle.

Another object of my invention is to provide for the use, in an improved resilient bushing, of an inner metal tube formed of bent sheet metal which is not welded or brazed together, this type of tube being relatively inexpensive as compared to the type of tube requiring welding or brazing.

Another object of my invention provides means, in an improved method of assembling said resilient bushing, for regulating the exact expansion and contraction of the rubber tube to permit easy telescoping of the movable metal tube over or into the rubber tube.

Another object of my invention is to provide, in an improved method of assembling resilient bushings, a press or similar mechanism having two cam movements, and a chamber for assembling said bushing having a male and female member, one cam movement pressing the male member of the assembly chamber into the female member, and the second cam movement applying high pressure and releasing the same when the two members of the assembly chamber are in fully closed position.

Another object of my invention is to provide a duplex or multiplex system of feeding the individual parts of my improved resilient bushing to the assembly chamber, either by hand or by any known automatic system such as dial feed, or magazine feed, or hopper feed or a combination of any of these feeds.

Another object of my invention is to provide means, in an improved method of assembling said resilient bushing, to prevent longitudinal or tangential movement between the contacting surfaces of the rubber tube and the inner and outer metal tubes.

Another object of my invention is to provide in a shackle or other like member, employing an improved resilient bushing of my invention, outstanding lugs forged in the sides of the shackle or other like member, which interlock with depressions formed in the ends of the inner metal tube of the resilient bushing of my invention, to prevent relative movement of the tube and the shackle member, (or vice versa).

Referring to the figures of drawings:

Fig. 22 is a cross-sectional view of the assembly chamber showing the male member now in contact with the female member of the assembly chamber;

Fig. 23 is a cross-sectional view of a screw nut of the male member of the assembly chamber;

Fig. 24 is a cross-sectional view of a cup of the male member of the assembly chamber;

Fig. 25 is a side elevational view of a portion of the bolt of Fig. 24 and of the friction spring of the male member of the assembly chamber;

Fig. 26 is a cross-sectional view of the centering pilot of the female member of the assembly chamber;

Fig. 27 is a sectional view of the assembly chamber of my invention as illustrated in Fig. 22, but showing the rubber tube in elongated flattened position on the inner metal tube due to the introduction of high pneumatic or hydraulic pressure;

Fig. 28 is a sectional view of the embodiment of my invention of Figs. 22 and 27 showing further elongation of the rubber tube caused by an increase in pressure, and shows the outer metal tube now in superposed relation to the rubber tube;

Fig. 29 is a sectional view of the embodiment of my invention of Figs. 22, 27, and 28 showing the rubber tube in contracted radial expanding relation to the outer and inner metal tubes after release of the hydraulic or pneumatic pressure;

Fig. 39 is a view partly in section of a press showing the complete assembly pneumatically operated;

Figs. 40 and 41 are views similar to Figs. 37 and 38 showing their position in relation to the pneumatically operated assembly;

Referring to the drawings, in all of which like parts are illustrated by like reference characters:

Figure 1:
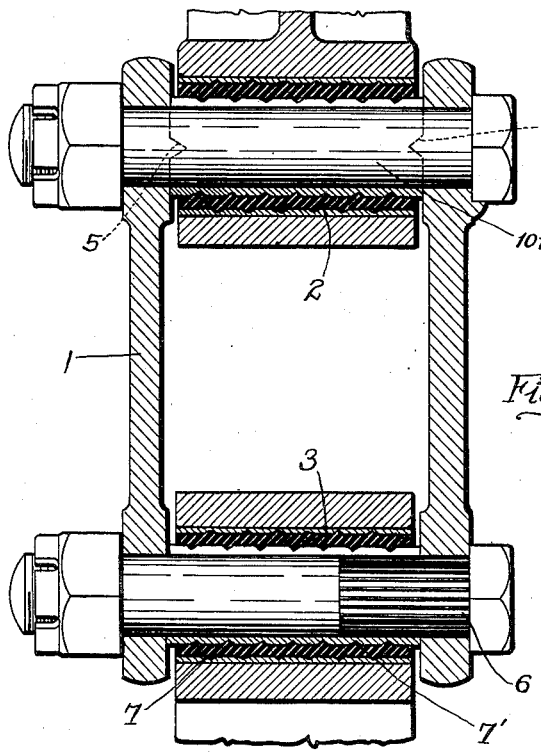
Fig. 1 is a medial sectional view of a shackle employing an assembled rubber bushing of my invention.
Figure 2:
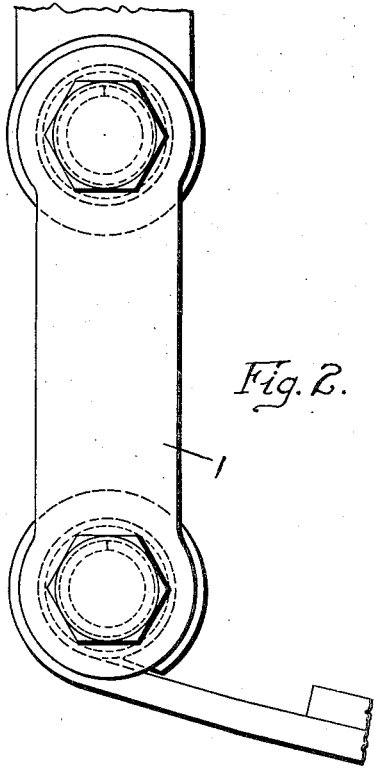
Fig. 2 is a side elevational view of Fig. 1.
Figure 3:
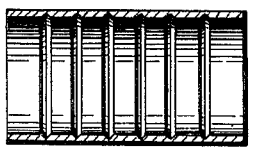
Fig. 3 is a longitudinal medial sectional view of an outer metal tube of my invention having circular grooves on its inner surface.
Figure 4:
Fig. 4 is an end view of the tube of Fig. 3.

In Fig. 1, at 1 I show a shackle having rubber bushings 2 and 3, the upper rubber bushing 2 being secured to the srackle 1 by depressions in the ends of the inner metal tube, which are interlocked with outstanding lugs 4 and 5 forged in the sides of the shackle to prevent relative movement of the tube and shackle member. The lower bushing 3 is secured to the shackle bolt 6 by serrations of the bolt surface produced by hobbing, knurling, or any other preferred process, pressing tightly into the inner metal tube and into the shackle to prevent relative movement of the inner metal tube and the bolt. Circular grooves 7 and 7' in the metal tubes are in staggered relation.

As illustrated in Figs. 3 to 10 inclusive, the metal surfaces engaged by the rubber tube are preferably provided with a plurality of spaced circular grooves, into which the rubber material is indented to restrain relative longitudinal movements between the metal and rubber tubes, and longitudinal grooves may also be provided to restrain relative rotary movements of the metal tubes, compressed between the two telescoped metal tubes.

As will be later shown, the outer metal tube may be free of depressions and securely held to the rubber tube by bending the ends of the inner metal tube inward if it is disposed on the outside of the rubber tube or by bending the ends of the inner metal tube outward if it is disposed on the inside of the rubber tube.

Figure 13:
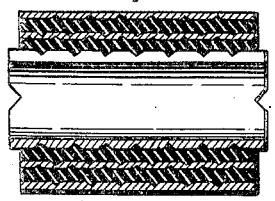
Fig. 13 is a sectional view of an embodiment of my invention.

Any number of alternate rubber and metal tubes may be used, as shown in Fig. 13, to obtain greater angularity of movement, but for the purpose of illustrating an embodiment of my invention, I have shown the use of two concentrically telescoped metal tubes having a tube of rubber or other resilient material interposed therebetween.

Figure 14:
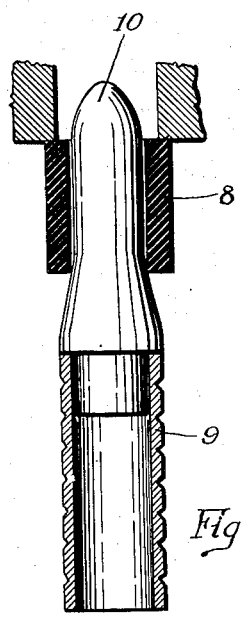
Fig. 14 is a view partly in section illustrating the first step in assembling the rubber bushing of my invention.
Figure 15:
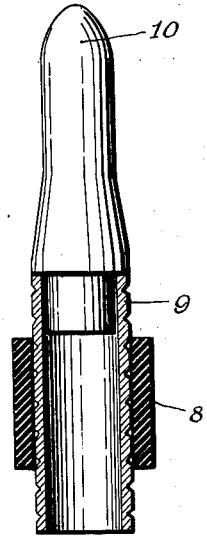
Fig. 15 is a similar view of the rubber bushing but showing the rubber in superposed relation to the inner metal tube.

The metal tubes and rubber tube are assembled in the following manner. In order to superpose the rubber tube 8, which has a smaller inside diameter than the outside diameter of the inner metal tube 9, over the same, as illustrated in Fig. 14, I employ an assembling tool or jig 10. In Fig. 15 I show the rubber tube in superposed relation to the metal tube.

Figure 18:
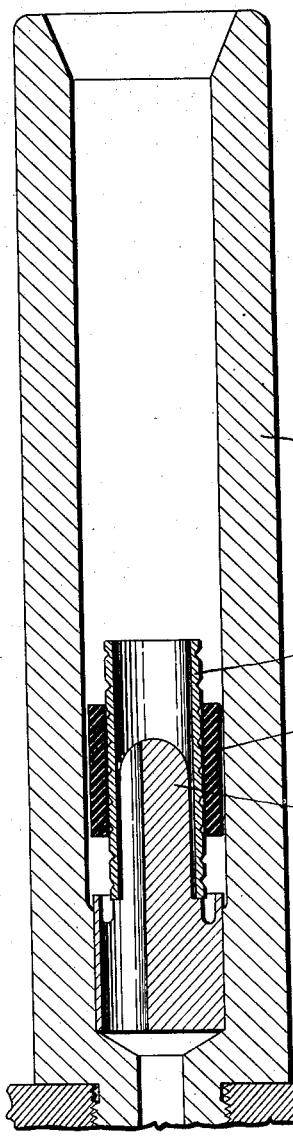
Fig. 18 is a sectional view showing the rubber and outer metal tube assembly of Figs. 14 and 15 resting at the bottom of the female assembly chamber.
Figure 16:
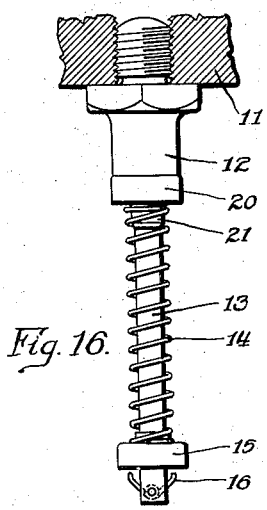
Fig. 16 is a view partly in section showing the male member of the assembly chamber.
Figure 17:
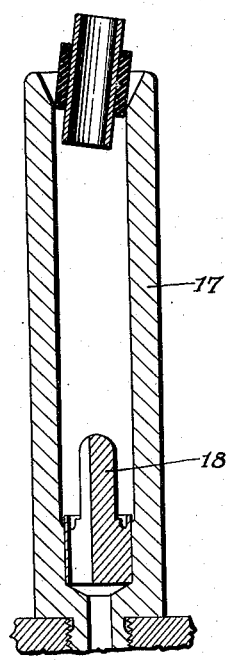
Fig. 17 is a sectional view illustrating the third step in assembling the rubber bushing of my invention.
Figure 19:
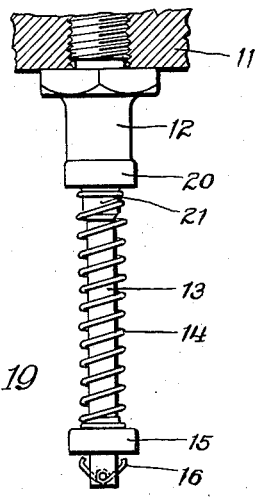
Fig. 19 is a view similar to Fig. 16 but reproduced hereon to illustrate the relative positions of the male and female members of the assembly chamber illustrated in Fig. 20.
Figure 20:
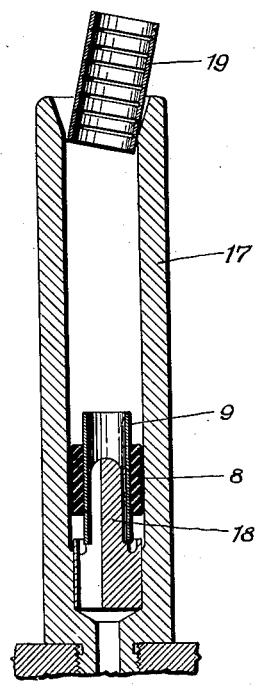
Fig. 20 is a view of the assembly chamber showing the female member housing the assembly as shown in Fig. 18, and showing the outer metal tube of my invention in its initial assembly position.
Figure 21:
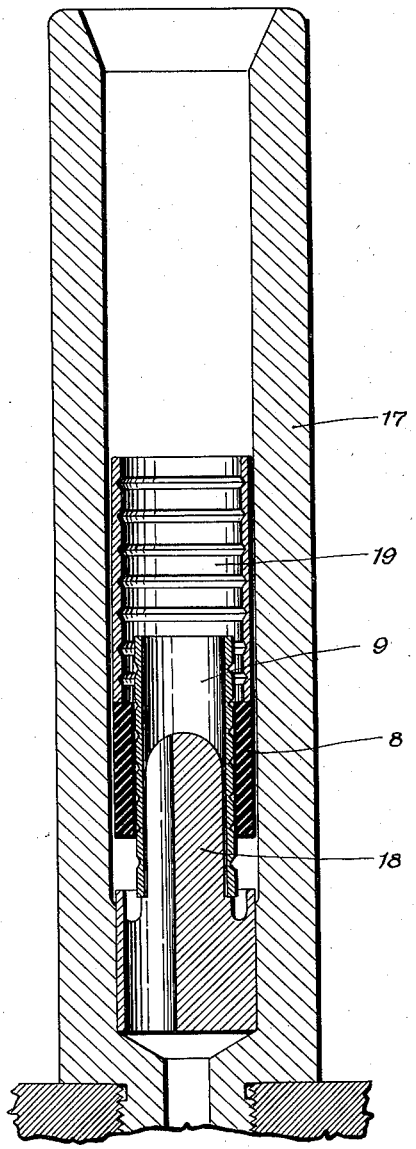
Fig. 21 is a sectional view of the assembly chamber showing the outer metal tube superposed over the inner metal tube but limited by the resting on the rubber tube which is superposed over the inner metal tube.
Figures 36, 37, 38:
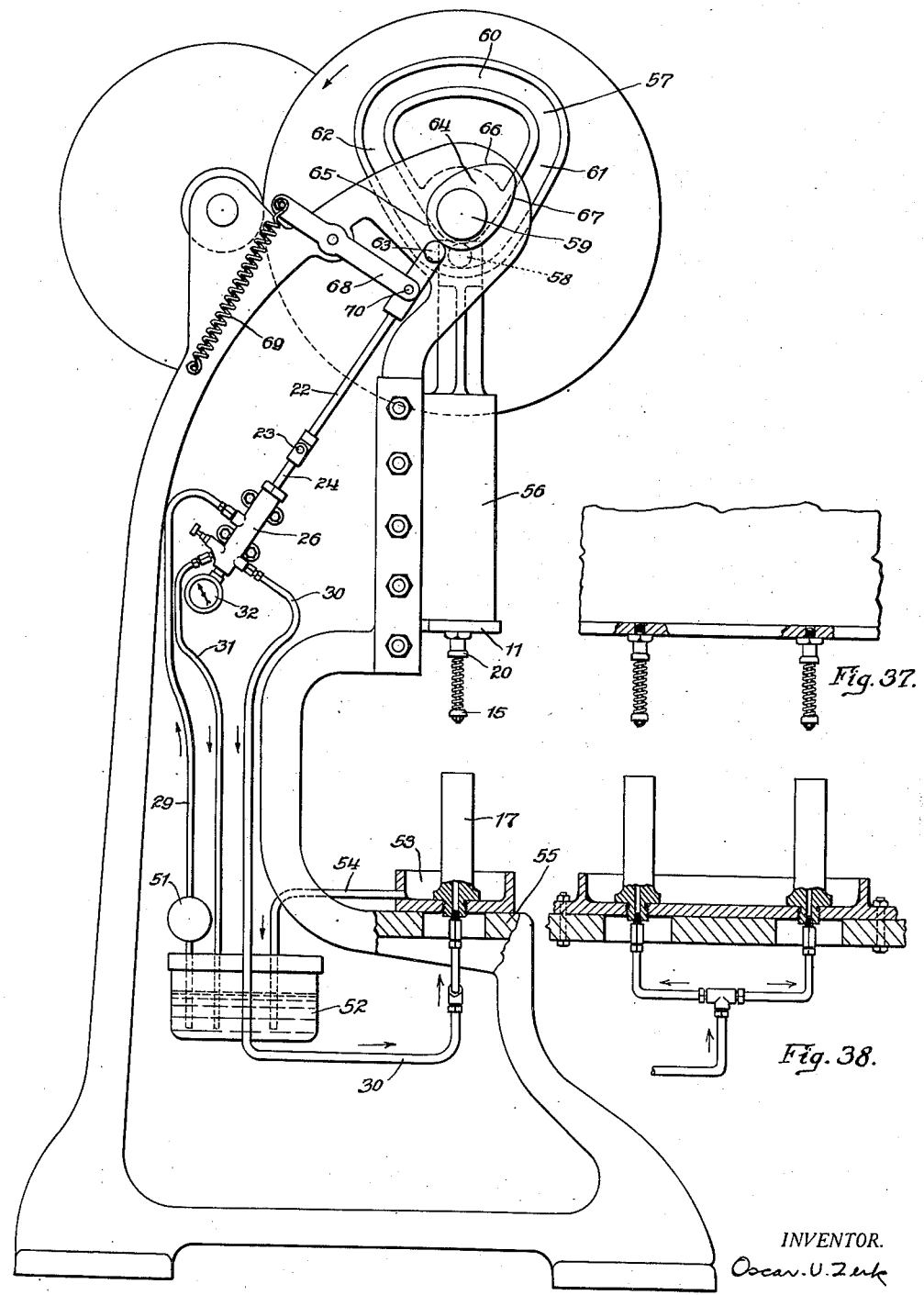
Fig. 36 is a view partly in section of a press showing the complete assembly hydraulically operated.
Fig. 37 is a side elevational view of the male member of the assembly chamber.
Fig. 38 is a side elevational view of the female member of the assembly chamber.

In Fig. 16 I show at 11 the reciprocable support for the male member of the assembly chamber having a head 12, a self-sealing leather cup 20, a screw nut 21, a stem 13, and a compression spring 14 secured at one end to the leather cup 20 and at the other end to a metal cup 15, and at 16 I show a friction spring. The male member of the assembly chamber, as later shown in Figs. 36 and 39, is affixed to the press illustrated therein. After the rubber tube and the metal tube have been assembled as previously described, they are dropped, as illustrated in Figs. 17 and 18, into the female member of the assembly chamber 17 and superposed over the head of the guiding pilot 18. The outer metal tube 19 is next dropped into the female member of the assembly chamber, through which, in the hydraulic system, water under relatively low pressure is flowing, and is superposed over the inner metal tube as shown in Fig. 21, but is limited in its downward movement by the rubber tube 8.

The male member 12 and associated parts is next introduced into the female member 17 of the assembly chamber and the leather cup 20 now closes the assembly chamber. The metal cup 15, having inlets 90 as shown in Fig. 24, similar to the inlets 91 in the centering pilot 18, as shown in Fig. 26, for receiving water in the hydraulic system or compressed air or gas in the pneumatic system, presses upon the upper portion of the outer metal tube 19, which is shown in Fig. 22.

The friction spring 16 engages the inside walls of the inner metal tube 9.

In the hydraulic system I now increase the pressure of the water which has previously been flowing through the assembly chamber but which is now limited by virtue of the closure of the chamber by the leather cup 20, and in the pneumatic system I now introduce high pneumatic pressure of either air or gas thus causing the rubber tube to expand longitudinally and to contract in diameter creeping lengthwise along the inner metal tube substantially evenly in both directions. Fig. 27 shows the exact movement when the rubber tube is thus elongated and shows the outside diameter of the rubber tube to be about equal to the inside diameter of the outside metal tube. The high pressure applied also forces the rubber into the depressions into the outside grooves of the inner metal tube.

The outer metal tube 19 which rested on the rubber tube 8 was, during this operation, raised and therefore the cup 15 has further compressed the compression spring 14. When, due to the mounting of the hydraulic or pneumatic pressure, the outside diameter of the rubber tube 8 is further decreased, the outer metal tube snaps downward due to the action of the compression spring 14, and takes the position shown in Fig. 28.

Instead of the spring 14, the force of gravity alone may be relied upon to effect the downward movement of the upwardly disposed metal tube 19, over the rubber tube 8, or as illustrated in the drawings, the force of gravity, and the force exercised by the spring may supplement one another.

Figure 30:
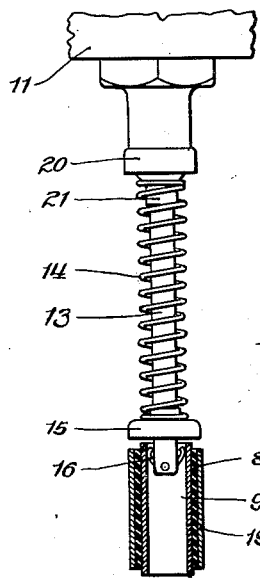
Figs. 30 and 31 show the male member of the assembly chamber, by means of its friction spring, illustrated in Fig. 25, removing the now completed rubber bushing of my invention.
Figure 31:
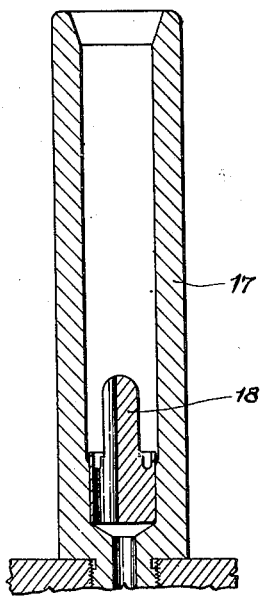

The high pneumatic or hydraulic pressure is now suddenly cut off before the two members of the assembly chamber start to separate from each other, and the rubber tube contracts longitudinally and expands in outer diameter, filling all of the depressions in the outer metal tube, and the rubber bushing composed of two concentrically telescoped metal tubes having a rubber tube interposed therebetween is now in completely assembled condition at the bottom of the assembly chamber as shown in Fig. 29. By means of the friction spring 16, as shown in Figs. 30 and 31, the entire assembled rubber bushing is next removed from the female assembly chamber.

This is effected by a receding movement of the head 12, moving the stem 13 upwardly, lifting with it the washer 103, which rests upon the cross pin 104, which passes through the stem 13, when the washer 103 engages the cup 15. This is lifted with the stem 13 to relieve the spring pressure previously exerted by the spring 14 through the cup 15 upon the outer metal tube 19 of the assembled article. The friction spring 16, pressing against the inner lateral walls of the inner tube 9, frictionally engages these walls and lifts the entire assembled multi-tubular article from the assembly chamber tube 17.

Figure 32:
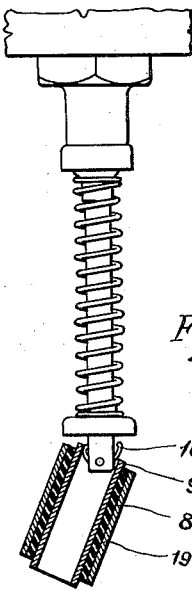
Figs. 32 and 33 illustrate my preferred method of voiding the assembly chamber entirely of the bushing.
Figure 33:
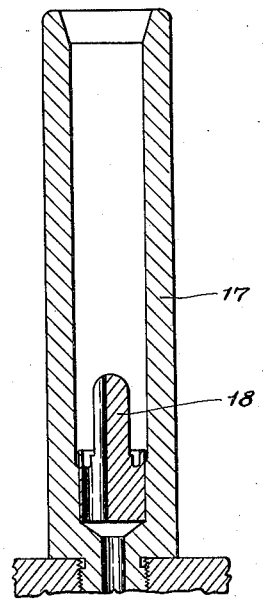

Figs. 32 and 33 best illustrate how, through a laterally applied throw-out movement, the assembled rubber bushing is disconnected from the friction spring 16 and thrown out. This movement can either be effected by hand or automatically, such as by a throw-out arm often used in stamping presses.

The assembly chamber, now void of rubber bushing parts, is ready for a repeated assembly operation. It must be noted that throughout all the operations where the female assembly chamber is not closed by the leather cup 20, in the hydraulic system, water under low pressure is continuously running into the female assembly chamber from the bottom through the ports in the centering pilot and out from the top of the female assembly chamber. This is important because all air bubbles in the water or adhering to any member of the assembly chamber are moved upwards due to their smaller specific gravity and the movement of the water.

All assembly positions of and the construction of the assembly chamber may be exactly the same in both the hydraulic and the pneumatic systems. The only difference is in the valve construction, which varies, because in the hydraulic system the fluid is non-compressible while in the pneumatic system it is compressible.

Figure 34:
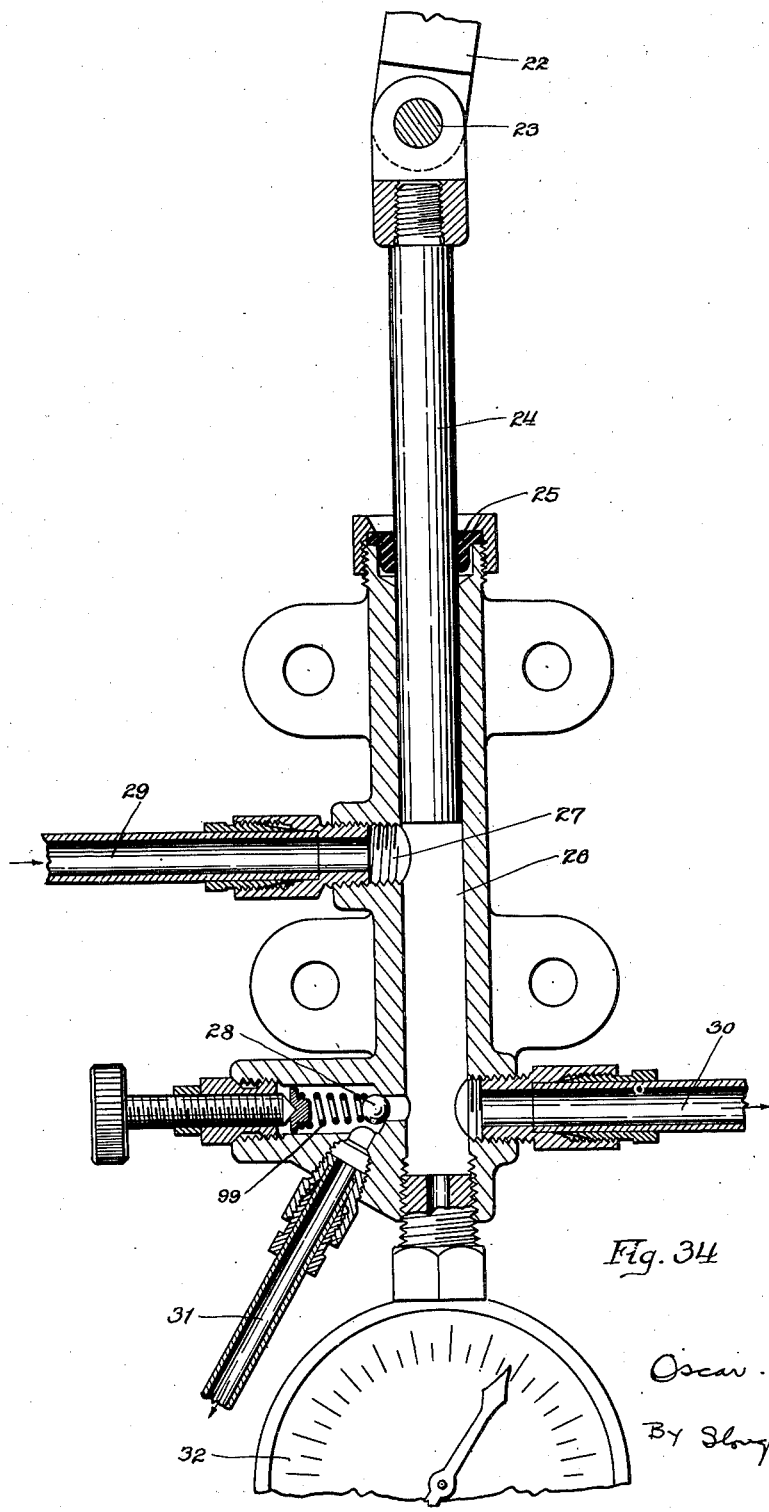
Fig. 34 is a sectional view of the valve mechanism of the hdraulic system employing a high pressure piston.

In Fig. 34, I show the valve mechanism for the hydraulic system. At 22 I show a rod leading to the valve actuating cam connected with the press, a joint 23, a high pressure piston 24, a self-sealing leather washer 25, cylinder 26, an inlet for water at low pressure 27, an adjustable safety valve 28, a water inlet pipe 29 at low pressure, a water outlet pipe 30 at high and low pressure, a pipe for excess water 31, and a gauge 32.

Normally water from a low pressure water pump runs through the pipe 29, inlet 27, pressure chamber 33 in the cylinder 26, and pipe 30, to the assembly chamber.

As soon as the male member of the assembly chamber is at its lowest position and is resting during a certain time interval, the high pressure piston 24 moves downward, first shutting off the low pressure water inlet 27 and then compressing all compressible elements in the system, such as leather plungers, air bubbles etc. which may be left in the system. The pressure will now quickly mount due to the fact that water is non-compressible, and as soon as it has reached a predetermined degree the pressure relief valve will automatically open and all surplus water escapes through the pipe 31, while the mounted pressure will remain substantially the same. The degree of pressure controls the compression of the outside diameter and wall of the rubber tube which diameter can be reduced by increasing the pressure of the spring 99 as indicated by the gauge 32, and in turn the pressure is regulated by the adjustment given the spring 99 and therefore the thickness of the rubber layer is regulated by the predetermined spring pressure exerted by the spring 99. A manually operable screw 110 serves to adjust the pressure of the spring 99.

In Figs. 36, 37 and 38 I have illustrated a press on which the complete set of operations hereinbefore described relating to the hydraulic system may be performed.

The assembly chamber 17 connects at the lower end thereof with the water supply pipe 30. With the parts in the position illustrated, water from a supply tank 52 is circulated by the pump 51 through the pipe 29, cylinder 26 and pipe 30 as described in connection with the valve construction of Fig. 34, and thence flows to the assembly chamber 17, overflowing the same into the receptacle 53 and thence by a drainpipe 54 back to the supply tank 52. The chamber 17 is rigidly supported on the lower jaw 55 of the press. The male member 12 of the chamber mounted for reciprocatory movement in a head 56 by means of a cam of the groove type 57 and a cam follower therein, 58, these parts being of well known or suitable construction.

The cam 57 is rotatably connected to a main press shaft 59 which is adapted to be rotated by power in a counter-clockwise direction as viewed in the drawings. The cam 57 has a portion 62 for forcing the member 12 downwardly, a portion 61 for elevating it and a dwell portion 60 for holding it in its downward position for a predetermined interval of time.

The valve actuating rod 22 is provided with a cam follower 63 on its upper end cooperating with a cam 64 on the shaft 59. The cam 64 has a dwell portion 65 and a valve operating portion 66 and valve releasing portion 67. A rocker arm 68 operated by a retracting tension spring 69 and connected to the rod 22 as at 70 is adapted to retract the valve rod 22 and maintain the cam follower 63 in engagement with the cam 64.

When the rod 22 is thrust downwardly by the cam 64, it operates the valve construction as described hereinbefore and any excess of water from the piston of the valve assembly may flow to the tank 52 by the pipe or conduit 31 as described.

The cams 64 and 57 are so designed and disposed on the shaft 59 that the two parts 12 and 17 of the chamber will be in their relatively closed position before the piston 24 of the valve applies the hydraulic pressure and so that the hydraulic pressure will be removed before the male and female members of the chamber are relatively moved toward their open position. Cams constructed substantially as illustrated when employed in connection with the disposition of parts shown in the drawings will effect this sequence of operations when the cams are rotated in the counter-clockwise direction as viewed in the drawings.

When the assembled multi-tubular articles are removed from the assembly chamber, after being assembled therein through the use of hydraulic pressure, I preferably remove any remaining traces of water adhering to the longitudinal surfaces of the rubber tube and the surfaces of the metal tubes engaged thereby, by placing the article in an oven, not shown, heated to above the boiling point of water, whereby any slight traces of water remaining will be converted into steam and will be blown out from between the engaging tubular surfaces, and be absorbed by the dry hot air of the oven.

Figure 35:
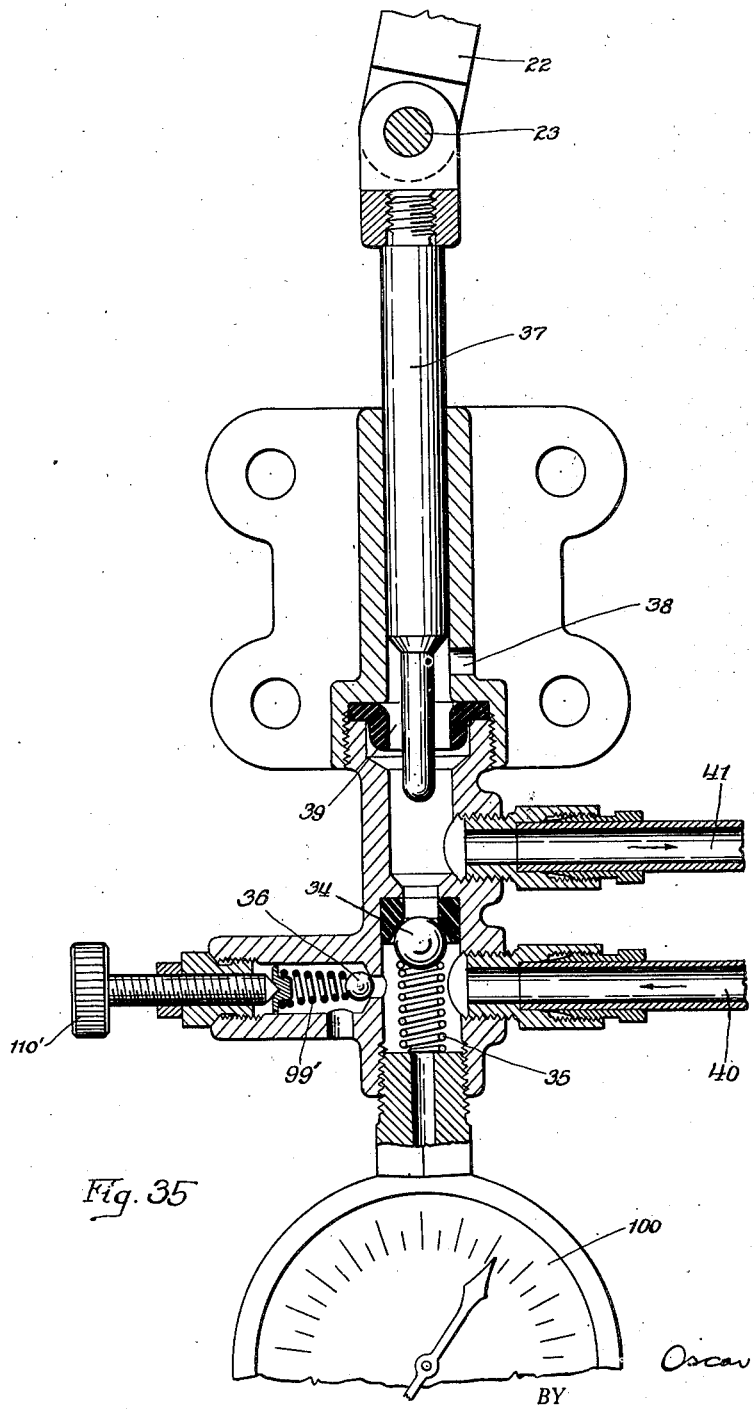
Fig. 35 is a sectional view of a similar valve mechanism for the pneumatic system.

Fig. 35 shows a similar valve arrangement for use in the pneumatic system. In the pneumatic system this high pressure piston is not necessary. The piston-like plunger is in this case just a push rod to open check valve 34. The pneumatic valve mechanism operates as follows:

Air from a high pressure air pump 50 (see Fig. 39) is normally pressed into the spring chamber 35 by air inlet pipe 40, there being interposed an air pressure reservoir 105 in the air line and all air over a predetermined pressure indicated on the gauge 100 escapes through the adjustable pressure relief valve 36. The valve ball 36 is pressed to its seat by a spring 99' whose pressure is adjusted by the manually operable adjustment screw 110'. Only during the time the assembly chamber is closed the push rod 37 closes the air vent 38, then passes the self-sealing washer 39 and opens the check valve 34. At this time air under pressure from air inlet pipe 40 and spring chamber 35 flows around the open check valve 34, and pipe 41 into the assembly chamber, reducing the rubber tube in diameter and telescoping the outer metal tube thereover. As soon as this is done the push rod 37 moves upward permitting the check valve 34 to close and after passing the washer 39, it opens the air vent 38. The purpose of the air vent 38 is to remove the pressure in the assembly chamber entirely before the male member of the assembly chamber moves upwards.

In Figs. 39, 40 and 41 I have shown a press for performing the steps of operations hereinbefore described pneumatically. The air pump 50 supplies air by the inlet conduit 40, through the valve construction and out by way of the conduit 41 to the assembly chamber 17. Cams 57 and 64 and the mounting for the male member of the chamber and the operation of the piston rod may be the same or similar to those described in connection with Fig. 36, and need not be further described here. And the operation of the valve construction indicated generally at 71 has hereinbefore been completely described. In this press also, the air pressure is not applied until the parts of the assembly are in closed position and is released before the two parts of the chamber are opened up.

As indicated in Figs. 40 and 41 and 37 and 38, either the pneumatic or the hydraulic system is adapted to use with a plurality of assembling chambers simultaneously operated. Furthermore, as will be understood, a duplex or multiplex system of feeding the individual parts to the assembly chamber, either by hand or by any known automatic system such as a dial or magazine feed with or without hopper feeds, is contemplated.

The compression in the assembly chamber must be released through air vent 38 before the male member of the assembly chamber moves upward. Only when the pressure is released can the elongated rubber tube contract longitudinally and radially expand. The male part of the assembly chamber must not move up before the pressure is released, otherwise the inner metal tube would move upward and if the rubber tube expanded at this latter period, the two metal tubes and the rubber tube would not be in the desired centrally related position. For this reason both in the hydraulic and pneumatic systems, cam movements should preferably be used, although with a modified mechanism, eccentric movements could be employed, with like results.

Figure 43:
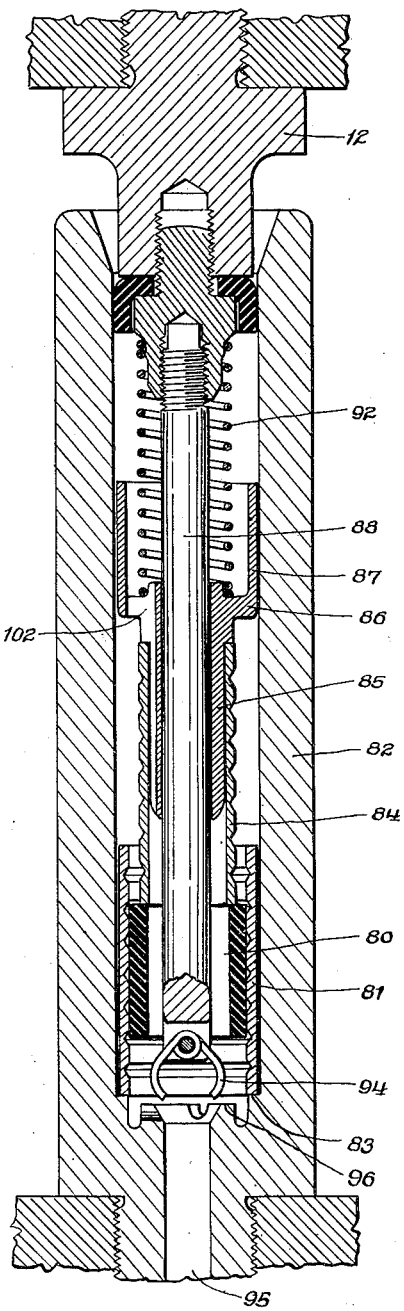
Figs. 43 and 44 are views in general similar to Figs. 22 and 29 respectively, but showing modifications for practicing other steps of the modified method of my invention.
Figure 42:
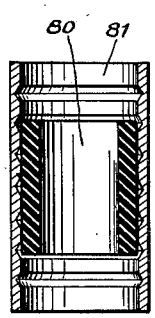
Fig. 42 is a view illustrating the first step of a modification of the method of my invention.
Figure 44:
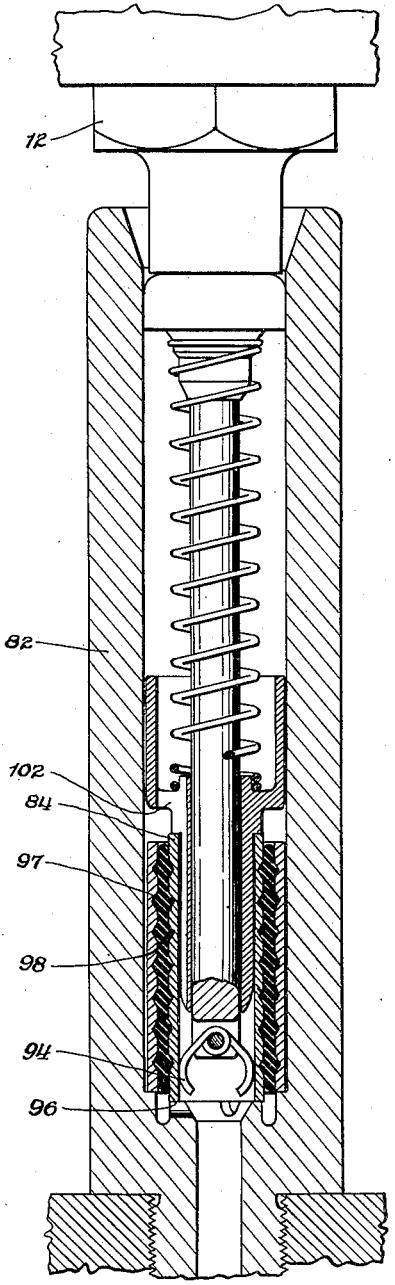

In Figs. 42, 43 and 44, I have illustrated a modification of the method of my invention and of the apparatus for carrying the same into effect.

In this modification, the rubber tube is forced under light pressure into the interior of the tube 81 which is to be the outer tube of the three tube assembly. The tubes 81 and 80 are then dropped into an assembly chamber 82 with the lower end of the tube 81 resting upon a shoulder 83 of the chamber.

The chamber 82 is adapted to be closed and sealed at its upper end by a chamber closing element 12 and the parts associated therewith similar to corresponding parts of the other form of my invention. Depending from the element 12 is a stem 88 upon which is slidably reciprocable a guide 86 apertured at 102 having an upwardly extending sleeve 87 engageable with the interior wall of the chamber 82 and a downwardly extending sleeve 85 slidably engageable with the stem 88. A spring 92 is disposed between the guide 86 and suitable portions of the element 12 to resiliently force the guide 86 downwardly in the chamber 82.

Before the sealing element 12 and its associated parts are inserted into the chamber 82 as shown in Fig. 43, a metal sleeve 84, which is to be the inner sleeve of the three sleeve assembly, is telescoped over the sleeve 85 with one end engaging a shoulder 93 on the guide. The parts thus described and movable with the closing element 12 are then inserted into the cylinder 82, closing and sealing the same in a manner that will be understood from the description of the other form of my invention.

The extreme lower end of the stem 88 is provided with a friction spring 94 similar to and for a purpose similar to that of the friction spring 16 of the other form of my invention. When the stem 88, guide 86 and metal tube 84 are inserted into the chamber 82, the spring 94 is inserted through and beyond the rubber tube 80 to the position shown in Fig. 43 and the lower end of the metal tube 84 abuts upon the upper end of the tube 80 and is resiliently held thereon by the spring 92.

With the parts shown in the positions of Fig. 43, pressure, pneumatic or hydraulic, is applied to the interior of the chamber 82 through the inlet 95 and spreads the rubber tube 80 over the interior wall of the tube 81, increasing the length of the tube 80 and increasing its internal diameter. When the internal diameter of the tube 80 has increased until it is approximately the same as the outside diameter of the tube 84, the latter is projected downwardly through the tube 80 by the spring 92, being stopped by engagement with a shoulder 96 of the chamber 82. The position of the parts is then illustrated in Fig. 44. The sleeve 85 in its downward movement embraces and is engaged by the spring 94.

The pressure is then removed. Application of the pressure forced the rubber into the annular groove 97 of the outer metal tube and upon releasing the pressure, the rubber filled the grooves 98 of the inner tube, as described hereinbefore in connection with the first method. The closing element 12 and its associated parts may now be removed and the frictional engagement of the spring 94 with the inner metal tube 84 will cause the three-tube assembly to be removed out of the chamber 82.

I contemplate also effecting the assembling of the outer and inner metal tubes with an interposed compressed layer of rubber between them, by first applying fluid pressure, either hydraulic or pneumatic, against the outer and inner walls of a rubber tube and then when the walls of the rubber tube are sufficiently flattened effecting elongation of the tube, with the outside diameter decreased and the inside diameter increased, to telescope both the outside and inside metal tubes over the compressed intermediate rubber tube, without any substantial friction, and then relieve the fluid or pressure in a manner which will be plain from the foregoing descriptions of the embodiments of my invention illustrated in the drawings.

Figure 5:
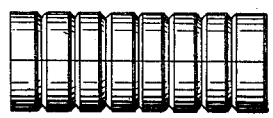
Fig. 5 is an elevational view of a split inner metal tube of my invention having circular grooves on its outer surface.
Figure 6:
Fig. 6 is an end view of the tube of Fig. 5.
Figure 7:
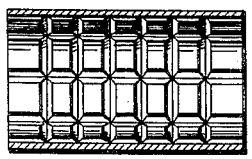
Fig. 7 is a view similar to Fig. 3 of an outer metal tube having longitudinal grooves as well as the circular grooves shown in Fig. 3.
Figure 8:
Fig. 8 is an end view of Fig. 7.
Figure 9:
Fig. 9 is a view similar to Fig. 5 of an inner metal tube having longitudinal grooves as well as the circular grooves shown in Fig. 5.
Figure 10:
Fig. 10 is an end view of Fig. 9.
Figure 11:
Fig. 11 is a sectional view of an embodiment of my invention.
Figure 12:
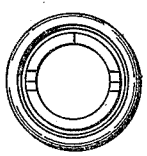
Fig. 12 is an end view of Fig. 11.

In Fig. 5 I have illustrated the inner metal tube as being provided with a longitudinal seam. By so making the tube it can be manufactured much more inexpensively than can a seamless tube, and the tube employing a seam can be used for the inner tube, since the only effect of the very considerable retractive force of the rubber exerting pressure against the inner tube would be to tend to close the seam even more tightly.

It is obvious that unless the wall of the outer tube were quite thick, the outer tube should preferably be of seamless construction.

In Figs. 1 and 3 to 6 inclusive, I show a multi-tubular cushioning element comprising inner and outer metal tubes with an interposed layer of rubber pressed between them wherein the inner tube 9 is provided with a longitudinal seam and is substantially thicker than the outer tube 19. The outer tube 19 may, however, be made by rolling a length of sheet metal of the desired thickness to tubular form and then welding the abutting edges together to provide the seamless construction and in such a case it is a more economical construction where the wall thickness is reduced as illustrated in the above mentioned figures of drawings.

When a bolt such as the shackle bolt 101, is driven into the bore of the inner tube 9, as illustrated in Fig. 1, and this inner tube is provided with a longitudinal seam as illustrated in connection with the uppermost multi-tubular cushioning element of Fig. 1, a tight fit may be had between the outer surface of the bolt and the inner surface of the inner tube 9, and the split tube construction will permit expansion of the inner tube to a slight degree thus permitting the bolt to be telescoped within the inner tube and at all times effecting a tight fit even though in the commercial manufacture of these articles variations within commercial limits in the diametrical dimensions of the bolt and tube may occur.

Were the tube 9 of seamless construction great difficulty would be experienced in effecting a proper fit between the bolt and the tube, to prevent looseness in the joint, or difficulties in driving the bolt into the tube. The inherently resilient rubber bushing 8 will permit a slight expansion of the inner tube 9 without any results injurious to the operation of the cushioning element.

In applying the pneumatic or hydraulic pressure to the pressure chamber, I preferably apply an excess of pressure over that necessary in order to sufficiently flatten the rubber tube to permit the ready free telescoping of the metal tube, such as the tube 19, Figs. 27, 28 and 29.

This provides a safety margin whereby should there be commercial variations in diametrical dimensions of either of the metal or rubber tubes, as is common, in all cases in the commercial operation of the apparatus, the telescoping operation will take place with a minimum of resistance by virtue of the pressure applied to the telescoped metal tube by the spring 14.

In the foregoing and in my claims I have in most instances referred to the intermediate bushing as composed of rubber. It is to be understood, however, that the application of my invention is not to be limited to the employment of rubber. Other solid materials having the fluent, resilient properties desirable to adapt them to the uses herein contemplated and to the processes and mechanisms herein set forth may be employed within the scope and spirit of my invention.

And it is to be particularly understood that the word "rubber" or any derivatives thereof employed in the claims hereof is to be taken as meaning rubber or any other material having those properties of rubber which are desirable in the application and practice of my invention.

Furthermore, hereinbefore I have shown and described one method and means for timing the movement of a tube into telescope relation with the resilient or rubber tube after the latter has been changed in diameter and elongated axially to preselected degrees. According to this means and method, the rubber or other resilient bushing is changed gradually in diameter until it permits the metal bushing, which is constantly maintained under resilient pressure in the axial direction, to be telescoped thereupon. Other means and methods, such as mechanical means, to this end may be employed, within the scope of my invention such, for example, as the actuation of a telescoping effort at the time of attainment of the desired axial length or desired diameter of the rubber or other resilient bushing.

My invention is not limited to any theory of operation particularly as to the longitudinal or axial elongation of the rubber bushing when subjected to hydraulic or pneumatic pressure. My understanding of the theory of operation in this respect is as follows:

When the rubber tube has been telescoped upon the inner metal bushing, it may be considered as a hollow cylinder, and its exterior surface is composed of a cylindrical side surface and two annular end surfaces disposed substantially at right angles to the cylinder axis. When hydraulic or pneumatic pressure is applied to the surface of the rubber tube by employment of the apparatus hereinbefore described, such pressure is applied only to these outer and end surfaces of the hollow rubber cylinder, inasmuch as the inner surface of the hollow rubber cylinder is sealed against the application of hydraulic or pneumatic pressure thereto by the intimate contact engagement of the inner wall of the rubber tube with the outside surface of the inner metal tube upon which it has been expanded during the operation of telescoping it therewith.

The hydraulic or pneumatic pressure will be impressed upon all of the exposed area of the rubber tube at the same pressure per square inch on all parts thereof. The pressure applied to the outer cylindrical surface will tend to squeeze the bushing to reduce its diameter and increase its length, and the pressure on the ends of the bushing will tend to decrease its length and increase its diameter. The area of the cylindrical part of the surface, however, being considerably greater than the combined annular end surfaces of the hollow rubber cylinder, the tendency to increase the length of the rubber bushing will preponderate the bushing will be elongated and the diameter decreased.

This flowing movement of the rubber takes place in a hermetically closed non-expandible chamber because rubber is substantially inherently incompressible. I use the ford substantially because very carefully conducted experiments have proved that properly cured rubber, which is not porous, may be compressed to decrease its volume one ten thousandth part for every kilogram pressure per square centimeter or fourteen and a half pounds per square inch.

By virtue of the fact that fluid pressure is simultaneously exerted upon all surfaces of the metal tubes during the pressure period in the assembly operation, all pressures exerted on the metal tubes are substantially equalized on the inner and outer surfaces of the metal tubes so that the use of a mandrel disposed within the inner tube, or a reinforcing means disposed against the outer surface of the outer metal tube, which would be required to prevent distortion of these metal tubes were mechanical pressures applied against a surface of such tubes, are rendered unnecessary.

However, the volumetric quantity of the rubber remains substantially the same during the elongation thereof. It is only its surface area which changes.

I claim:

1. The method of assembling the constituent parts of a rubber bushing element consisting in first relatively telescoping a metallic tube and a rubber layer, then applying fluid pressure to the exposed tubular surface of the rubber layer, to flatten and elongate the rubber layer against a wall of the metal tube, then telescoping a second tubular metal tube to effect disposition of the layer of rubber between the metal tubes, then relieving the fluid pressure.

2. The method of assembling the constituent elements of a resilient bushing comprising first, applying fluid pressure to an exposed surface of a rubber layer to flatten it against a corresponding wall of a relatively rigid tube, and then, while maintaining the fluid pressure against such wall, telescoping a second relatively rigid tube to a position whereby the layer of rubber will be interposed between the relatively rigid tubes, then relieving the fluid pressure.

3. The method of relatively telescoping a rubber layer and a metal tube having conflicting diameters, consisting in first relatively telescoping the rubber layer with a second metal tube, then applying fluid pressure to the exposed tubular wall surface of the layer of rubber to flatten it sufficiently so that its effective diametrical dimensions are such that the metal tube may be telescoped over the surface of the rubber layer exposed to the fluid pressure, then in relieving the fluid pressure.

4. The method of providing an improved cushioning element consisting in first placing a layer of rubber in intimate face to face contact with a layer of metal, then applying fluid pressure to the opposite exposed surface of the rubber, then, during application of the fluid pressure, applying a tube of metal over the said rubber exposed surface, and then relieving the pressure.

5. The method of assembling the constituent parts of a rubber bushing element consisting in first relatively telescoping a metallic tube and a rubber tube, then applying fluid pressure to the exposed tubular wall surface of the rubber tube, to flatten and elongate the rubber tube against a wall of the metal tube, then telescoping a second metal tube to effect disposition of the rubber tube between the metal tubes, then relieving the fluid pressure.

6. The method of assembling the constituent elements of a resilient bushing comprising first, applying fluid pressure to an exposed wall surface of a rubber tube to flatten it against a corresponding wall of a relatively rigid tube, and then, while maintaining the fluid pressure against such wall, telescoping a second relatively rigid tube to a position whereby the rubber tube will be interposed between the relatively rigid tubes, then relieving the fluid pressure.

7. The method of relatively telescoping a rubber tube and a metal tube having different diameters, consisting in first relatively telescoping the rubber tube with a second metal tube, then applying fluid pressure to the exposed tubular wall surface of the rubber tube to flatten it sufficiently so that its effective diametrical dimensions are such that the metal tube may be telescoped over the surface of the rubber tube exposed to the fluid pressure, then in relieving the fluid pressure.

8. The method of providing an improved cushioning element consisting in first placing a rubber tube in intimate face to face contact with a layer of metal, then applying fluid pressure to the opposite exposed surface of the rubber, then, during application of the fluid pressure, applying a tube of metal contiguous to the said rubber exposed surface, and then relieving the pressure.

9. The method of assembling the constituent parts of a cushioning element consisting in first relatively telescoping a rubber tube and a metallic frame element having a tubular surface engageable with a wall surface of said tube, then applying fluid pressure to the exposed tubular wall surface of the rubber tube to flatten and elongate the rubber layer against a wall of the metal tube, then telescoping the rubber tube and frame element into a metal tube having an inside diameter approximately corresponding to the outside diameter of the rubber tube, then relieving the fluid pressure.

10. In an apparatus for producing multi-tubular bearing bushings, a guide element adapted to engage the end of a metallic bushing and formed to telescopically enter and expand a rubber bushing and guide the same onto the outer surface of the metal bushing and having a pointed end, a tapering portion inwardly of the end and an intermediate substantially cylindrical portion.

11. In an apparatus for producing multi-tubular bearing bushings, a pilot element comprising a body portion, a stem portion of reduced diameter, an intermediate shoulder, and a tapered opposite end portion, a second tapering portion inwardly thereof and a substantially cylindrical portion intermediate the tapered portions, the stem being telescopable into a metallic bushing with the shoulder engaging the end of the bushing and the tapered end telescopable into a rubber bushing to guide the same telescopically over the body portion and onto the outer surface of the metallic bushing.

12. In an apparatus for producing multi-tubular bearing bushings, an interiorly cylindrical assembly chamber, a pilot element in the chamber adapted to axially support therein a bushing tube and provided with a sealable tube entrance and with a fluid pressure inlet.

13. In an apparatus for producing multi-tubular bearing bushings, an interiorly cylindrical assembly chamber, a pilot element in the chamber at one end thereof adapted to axially support therein a bushing tube and provided with a sealable tube entrance at the opposite end of the chamber and with a fluid pressure inlet.

14. In an apparatus for producing multi-tubular bearing bushings, an interiorly cylindrical assembly chamber, a pilot element rigidly telescopically secured in the chamber adjacent one end, a fluid pressure inlet in the said end of the chamber, a longitudinally disposed fluid passageway through the pilot element, the pilot element being adapted to axially support therein a bushing tube and the opposite end of the chamber being provided with a sealable entry for the bushing tube.

15. In an apparatus for producing multi-tubular bearing bushings, an interiorly cylindrical assembly chamber, a pilot element in the chamber adjacent one end thereof, a shoulder on the pilot element adapted to support the end of an inner bearing bushing tube, the chamber being of such diameter as to telescopically guide axially therein the corresponding outer bearing bushing tube and the pilot element being provided with a support for the said outer tube coaxial with the inner tube, a passageway for admitting fluid pressure to the chamber and a communicating passageway longitudinally disposed through the pilot element.

16. In an apparatus for producing multi-tubular bearing bushings, an assembly chamber comprising a charging portion adapted to receive tubular elements of the bushing to be assembled, means in the charging portion to axially align the tubular elements for assembling, and a chamber closing portion provided with means for engaging assembled bushing elements to remove them from the chamber upon removal of the chamber closing portion.

17. In an apparatus for producing multi-tubular bearing bushings, an assembly chamber comprising a charging portion adapted to receive tubular elements of the bushing to be assembled, means in the charging portion to axially align the tubular elements for assembling, an entry in the chamber for the bushing elements, a removable chamber closing portion adapted to seal the entry and provided with means projecting into the chamber for engaging the assembled bushing elements to remove them from the chamber upon removal of the chamber closing portion.

18. In an apparatus for producing multi-tubular bearing bushings, an assembly chamber comprising a charging portion adapted to receive tubular bushing elements to be assembled, means in the charging portion to axially align the tubular elements for assembling, an entry into the chamber for the bushing elements, means to seal the entry and means whereby fluid pressure may be admitted to the chamber and applied to the interior and exterior of the tubular elements therein.

19. In an apparatus for producing multi-tubular bearing bushings, an assembly chamber comprising a charging portion adapted to receive tubular elements to be assembled, means in the charging portion to axially align the tubular elements for assembling, a sealable entry for the bushing elements, a movable chamber portion movable to close the chamber, a sealing element on the movable chamber portion for sealing the entry and means for admitting fluid pressure to the cylinder after movement of the closing movable portion has ceased.

20. In an apparatus for producing multi-tubular bearing bushings, an assembly chamber for receiving bushing elements to be assembled, provided with an entry for the elements, a movable portion of the chamber adapted to be moved to close the entry, means for admitting liquid to the chamber under relatively low hydraulic pressure, means for subsequently moving the movable portion of the chamber to close and seal the entry and means for increasing the hydraulic pressure after movement of the movable portion ceases.

21. In an apparatus for producing multi-tubular bearing bushings, an assembly chamber for receiving bushing elements to be assembled, the chamber having an entry for the elements and provided with a movable portion adapted to close and seal the entry, means for flowing liquid through the chamber when the said entry is open, means for moving the movable portion to close and seal the entry and means for increasing the hydraulic pressure of liquid in the chamber after movement of the movable portion has ceased.

22. In an apparatus for producing multi-tubular bearing bushings, a chamber for receiving tubular elements to be assembled, means in the chamber for axially aligning the tubular elements for assembling, an entry in the chamber for the elements, means for closing the entry, means for applying a predetermined fluid pressure to the interior of the chamber after the closure thereof, said means comprising mechanism for generating pressure in excess of the predetermined pressure and an adjustable escapement valve for regulating the applied pressure.

23. In an apparatus for producing multi-tubular bearing bushings, a chamber for receiving tubular elements to be assembled, means in the chamber for axially aligning the tubular elements for assembling, an entry in the chamber for the elements, means for closing the entry, means for applying a predetermined fluid pressure to the interior of the chamber after the closure thereof, said means comprising mechanism for generating pressure in excess of the predetermined pressure and an adjustable escapement valve for regulating the applied pressure, and an indicator for indicating the applied pressure.

24. In an apparatus for producing multi-tubular bearing bushings, a chamber for receiving tubular elements to be assembled, an entry in the chamber for the elements, a movable chamber portion for opening and closing the entry and a cam for operatively moving it, means for generating fluid pressure and applying it to the interior of the chamber, and a cam for controlling the application of the pressure, the cams being formed to cause the application of the pressure to occur after the closure of the chamber and to be released before opening of the chamber.

25. In an apparatus for producing multi-tubular bearing bushings, means for telescopically forcing a rubber bushing over a metallic inner bushing, an elongated chamber for receiving and supporting axially therein the assembled rubber bushing and inner bushing unit, an entry in the chamber for the unit and for an outer metal bushing, a movable chamber closing element movable to close and seal the chamber and provided with means to engage the unit for subsequently removing it, means for admitting fluid pressure to the chamber of predetermined and sufficient amount to compress the rubber bushing to reduce its diameter and increase its length along the inner bushing, means for thereupon moving the outer metal bushing telescopically over the compressed rubber bushing, means for then releasing the pressure to permit the rubber bushing to contract longitudinally and to expand transversely to fill the said outer bushing, and means to remove the movable chamber closing element to remove the assembled bushing.

26. The method of relatively telescoping a rubber layer and a pair of metal tubes having different diameters, consisting in first relatively telescoping the rubber layer within an outer metal tube, then applying fluid pressure to the exposed inner tubular surface of the layer of rubber to flatten it sufficiently so that its effective internal diametrical dimensions will be such that the second metal tube may be telescoped within the rubber layer, then in relieving the fluid pressure.

27. The method of relatively telescoping a rubber tube and a pair of metal tubes having different diameters, consisting in first relatively telescoping the rubber tube within an outer metal tube, then applying fluid pressure to the exposed inner surface of the rubber tube to flatten it sufficiently so that its effective internal diameter is such that the metal tube may be telescoped within the rubber tube, than in relieving the fluid pressure.

28. The method of assembling the constituent parts of a cushioning element consisting in first relatively telescoping a rubber tube within a metal tube, then applying fluid pressure to the exposed tubular surface of the rubber tube to flatten it and elongate the rubber against the wall of the metal tube, then telescoping within the flattened rubber tube, a second metal tube having an outside diameter approximately corresponding to the inside diameter of the rubber tube, then relieving the fluid pressure.

29. In an apparatus for producing multi-tubular bearing bushings, means for telescopically forcing a rubber bushing into a metallic outer bushing, an elongated chamber for receiving and supporting axially therein the assembled rubber bushing and outer bushing unit, an entry in the chamber for the unit and for an inner metal bushing, a movable chamber closing element movable to close and seal the chamber and provided with means to engage the unit for subsequently removing it, means for admitting fluid pressure to the chamber of predetermined and sufficient amount to compress the rubber bushing to increase its internal diameter and to increase its length along the outer bushing, means for thereupon moving the inner metal bushing telescopically into the compressed rubber bushing, means for then releasing the pressure to permit the rubber bushing to contract longitudinally and to expand transversely to intimately engage the inner bushing, and means to remove the movable chamber closing element to remove the assembled bushing.

30. The method of relatively telescoping a rubber tube and a metal tube having different diameters, consisting in first relatively telescoping the rubber tube with a second metal tube, then applying fluid exerting a predetermined excess of fluid pressure to the exposed tubular wall surface of the rubber tube to flatten it sufficiently so that its effective diametrical dimensions are such that the metal tube may be telescoped freely over the surface of the rubber tube exposed to the fluid pressure, then in relieving the fluid pressure.

31. In an apparatus for producing multi-tubular cushioning elements, in combination with a tube of rubber or like material, and a metal tube, of means for applying fluid pressure to at least one tubular wall of the rubber tube, to change a diametrical dimension of a tubular surface thereof and spring means to effect the telescoping of the rubber and metal tubes subsequent to the application of the fluid pressure to the rubber tube.

32. In an apparatus for producing multi-tubular cushioning elements, in combination with a tube of rubber or like material, and a metal tube, of means for applying fluid pressure to at least one tubular wall of the rubber tube, to change a diametrical dimension of a tubular surface thereof, means positioning the rubber and metal tubes in relative approximately vertical alignment, whereby after the application of fluid pressure to the rubber tube relative telescoping of the tubes will be effected by the force of gravity.

33. In an apparatus for producing multi-tubular cushioning elements, in combination with a tube of rubber or like material, and a metal tube, of means for applying fluid pressure to at least one tubular wall of the rubber tube, to change a diametrical dimension of a tubular surface thereof, means positioning the rubber and metal tubes in relative approximately vertical alignment, whereby after the application of fluid pressure to the rubber tube relative telescoping of the tubes will be effected by the force of gravity, and spring means for augmenting the effect of gravity to effect the spring pressure operation.

34. The method of relatively telescoping a rubber layer and a metal tube having different diameters, consisting in first relatively telescoping the rubber layer with a second metal tube, then applying fluid pressure to the exposed tubular wall surface of the layer of rubber to flatten it sufficiently so that a space exists between the outside diameter of the rubber tube and the inside diameter of the outside metal tube during the assembly operation.

35. The method of relatively telescoping a rubber layer and a metal tube having different diameters, consisting in first relatively telescoping the rubber layer with a second metal tube, then applying fluid pressure to the exposed tubular wall surface of the layer of rubber to flatten it sufficiently so that a space exists between the inside diameter of the rubber tube and the outside diameter of the inside metal tube during the assembly operation.

36. The method of reducing the transverse dimensions of an elongated rubber article preparatory to encasing it laterally consisting in placing the article in a fluid pressure chamber, then in applying a fluid pressure to the interior of the chamber and regulating the pressure according to the degree of reduction of the transverse dimensions of the article desired to be accomplished.

37. In an apparatus for producing an elongated article consisting of an elongated body of rubber or like material, and relatively rigid casing means therefor, a chamber for receiving the rubber and casing elements, means for supplying fluid under pressure to the interior of the chamber, a venting valve for said chamber, and means responsive to a change of form of the rubber or like body to effect the reception of the body in the casing.

38. In an apparatus for producing an article consisting of a body of rubber or like material, and relatively rigid casing means therefor, a chamber for receiving the rubber body and casing means in preassembling relative position, means for supplying fluid under pressure to the interior of the chamber to distort the rubber body, means in the chamber to move the body and casing relatively into assembled relation, and an adjustable venting valve for said chamber to regulate the fluid pressure therein, said venting valve comprising a valve element, a spring exerting pressure on the valve element to maintain it closed, and means for manually adjusting the pressure of the spring upon said valve element.

39. In an apparatus for producing an article consisting of a body of rubber or like material, and relatively rigid casing means therefor, a chamber for receiving the rubber body and casing means in preassembling relative position, means for supplying fluid under pressure to the interior of the chamber, said rubber body adapted to so change its form when a given fluid pressure is exerted upon it, means in the chamber for thereupon moving the casing and the body relatively into assembled relation, and adjusting means for predetermining the degree of the change of form of the rubber body.

40. In an apparatus for producing multi-tubular bearing bushings, an assembly chamber comprising a charging portion adapted to receive tubular elements of the bushing to be assembled, an entry in the chamber for the bushing elements, a removable chamber closing portion adapted to seal the entry and provided with means projecting into the chamber for engaging the assembled bushing elements to remove them from the chamber, and means operating to communicate fluid under high pressure to the interior of the chamber and means for successively assembling the tubular bushing elements, relieving the fluid pressure, and then withdrawing the chamber closing portion from the chamber and removing the assembled bushing element from the chamber.

41. The method of providing an improved cushioning element consisting in first placing a layer of rubber in intimate face to face contact with a layer of metal, then applying hydraulic pressure to the opposite exposed surface of the rubber, then, during application of the hydraulic pressure, applying a tube of metal over the said rubber exposed surface, then relieving the pressure, and then heating the assembled article to remove any water particles adhering to the engaged surfaces of the rubber and metal.

OSCAR U. ZERK.